Figure 1:
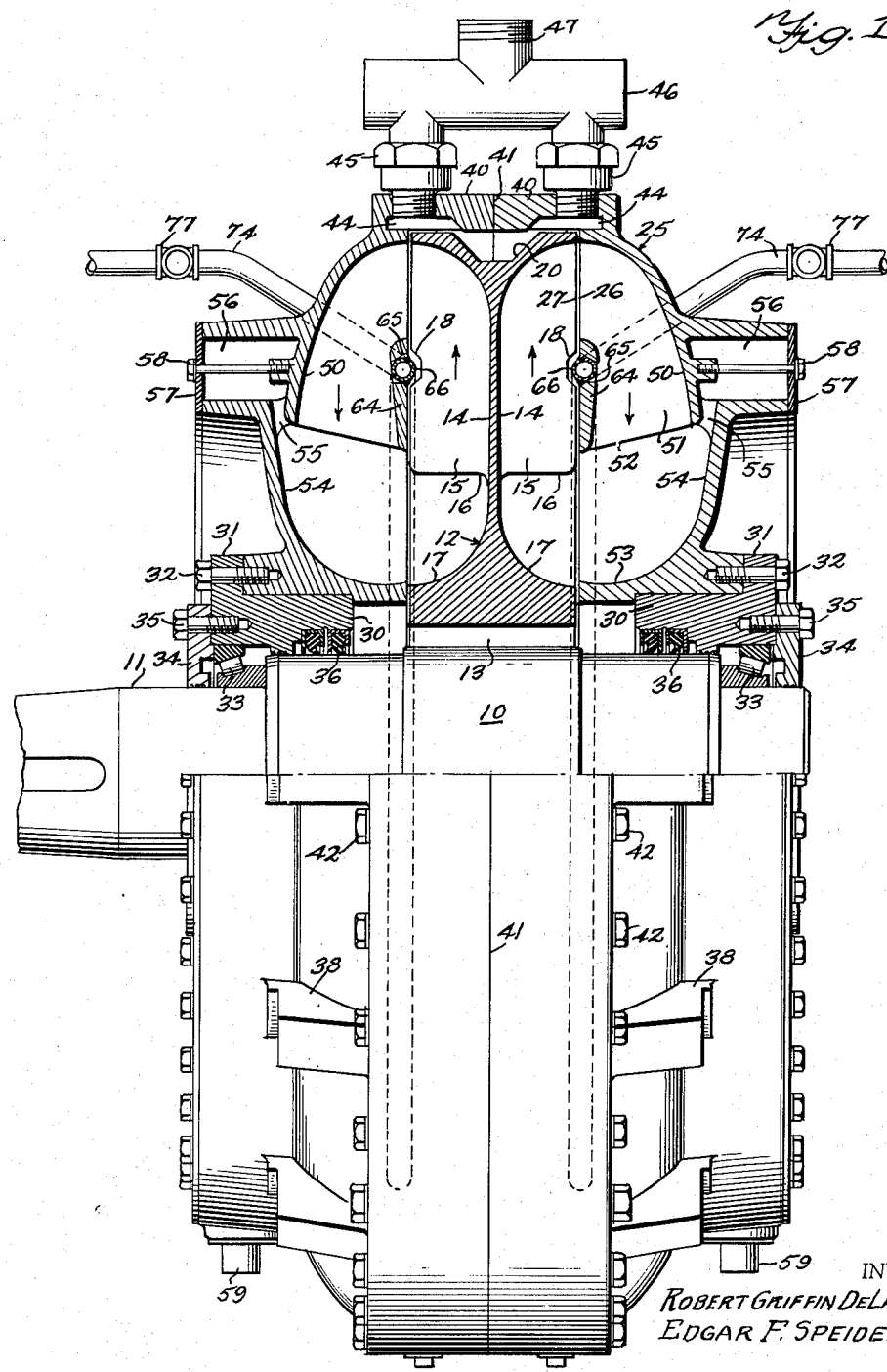

INVENTORS
ROBERT GRIFFIN DE LA MATER
EDGAR F. SPEIDEN
BY John F. Phillips
ATTORNEY

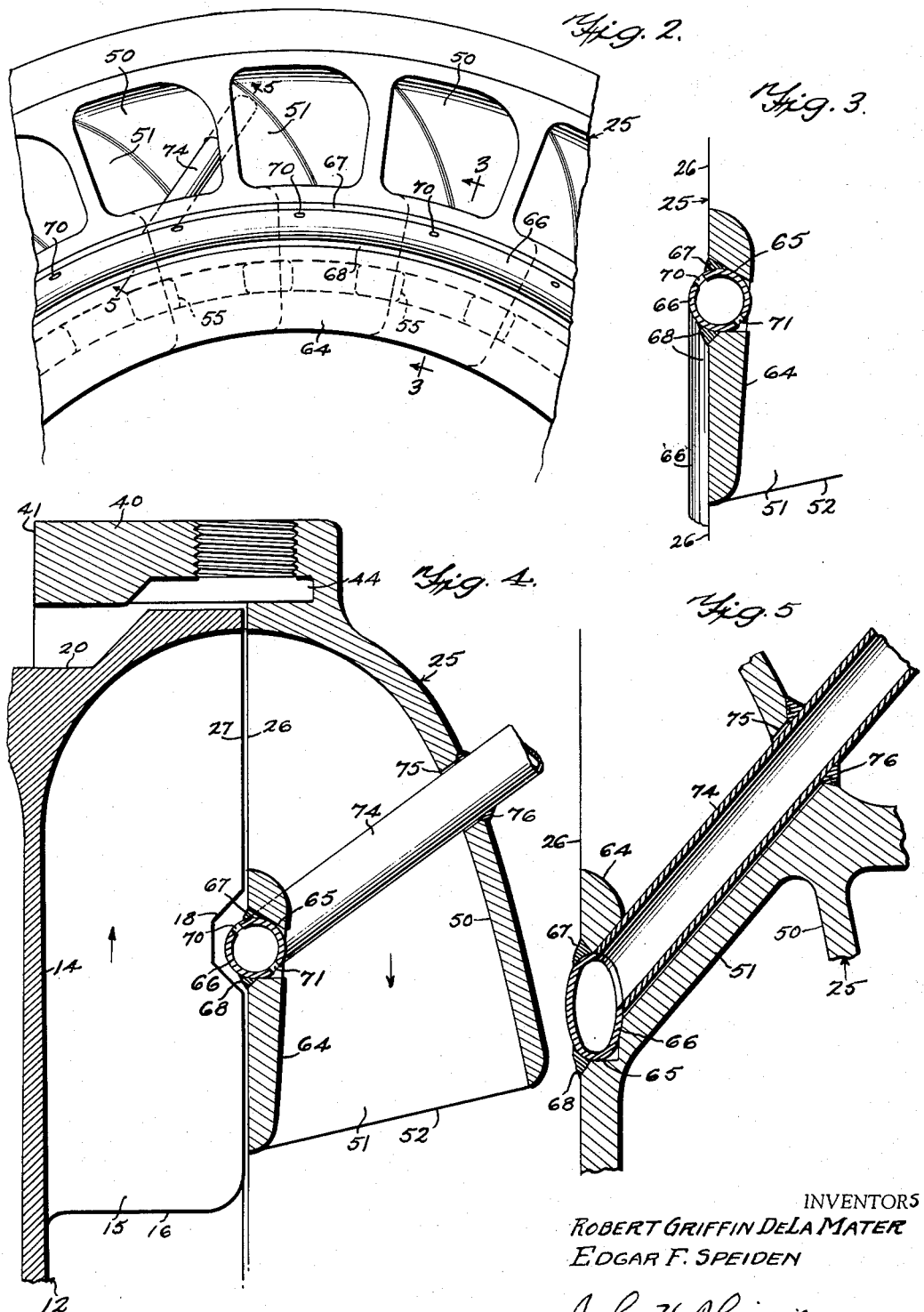

United States Patent Office

2,733,778
Patented Feb. 7, 1956

2,733,778

HYDRODYNAMIC BRAKE WITH VENT

Robert Griffin De La Mater and Edgar F. Speiden, Parkersburg, W. Va., assignors to The Parkersburg Rig & Reel Company, Parkersburg, W. Va., a corporation of West Virginia Application April 2, 1952, Serial No. 280,144

21 Claims. (Cl. 188—90)

This invention relates to hydrodynamic brakes.

Hydrodynamic brakes of various types have come into general use for many purposes and have been found particularly satisfactory for limiting rotational speeds independently of or in conjunction with friction brakes. Water is the commonly used fluid medium in brakes of this type, and as is well known, it has been necessary to maintain a flow of water through a brake of this type while the brake is in operation.

When a hydrodynamic brake is in operation, any entrapped or entrained air and any water vapor that may be formed has a tendency to collect in the center areas of the pockets. This area, with respect to individual coacting pockets of the rotor and stator, may be termed the center of vortex of the circulated water, but actually such space, if uniformly distributed, will be generally toroidal in form, extending annularly around the interior of the brake. Actually, this space is never unbrokenly annular, but may be broken between pockets and otherwise lacking in annular uniformity. Whatever its form, it can be disadvantageous during the operation of the brake for reasons given below.

There are two principal reasons for the entrapping of air and vapor around the center of vortex referred to. When the brake is in operation, the entrapped air and vapor is sealed off and prevented from escaping through the discharge opening at the outer circumference of the brake by an encircling ring of water. Also, and as a result of the centrifuge action of the brake, the air and water vapor being of lighter specific gravity than water, are separated out into the center of the water circulation.

This entrapping of air and vapor, when the brake is operated only for short periods of time, has little or no detrimental effect. For example, this would be true in the operation of a hydrodynamic brake in conjunction with an oil well drawworks, where the brake may be in operation for only about fifteen seconds out of every minute. During the period of time when the brake is not in operation, any accumulation of air and vapor is free to escape through the then open discharge port. During such short period of operation, the water vapor formed generally will not be sufficient in volume adversely to affect brake operation, and the air that is entrapped has a definite tendency to control and maintain the same volume of the pockets available for circulating water and, therefore, is a help in maintaining a uniform resistance.

The entrapment of air or vapor, however, can have a serious detrimental effect when a hydrodynamic brake is operated for sustained periods, and particularly when closely controlled resistance is required. In this case, an increase in the accumulation or expansion of the air and vapor will crowd out an equal volume of circulating water, thus reducing the capacity of the brake and causing an erratic brake action. It can also have a serious detrimental effect for short or long periods of brake operation when the maximum resistance is required and the temperature of the circulating water is close to the boiling point.

Previous efforts have been made to overcome the disadvantage referred to, but such efforts have not been completely successful. This is particularly true in brake structures wherein fresh water is introduced into the brake approximately at the centers of the pockets, that is approximately in the vortex center. Where pressure is present in the entrapped air and water vapor, such pressure interferes with the influx of water, thus requiring the introduction of water under pressure.

An important object of the present invention is to provide an improved method of venting the pockets of a hydrodynamic brake, thus increasing the effectiveness of the brake for sustained periods of operation, and particularly when closely controlled resistance is required.

A further object is to provide such an apparatus wherein vent openings for venting the entrapped air or water vapor, or the partial vacuum which is sometimes present, can be placed most advantageously both with regard to the circumferential and radial arrangements of such vent openings.

A further object is to provide such an apparatus wherein the venting takes place through a hollow torus having vent openings therein most advantageously arranged for the venting of the brake, and wherein the operation of the apparatus is such as to permit the uniform distribution of water completely around the brake.

A further object is to provide such an apparatus which makes it impossible for the pressure or vacuum in the center vortex to vary about the circumference of the brake as otherwise might be the case, if, for example, there were any reason for an uneven distribution of the cool inlet water or discharge of hot water from the pockets about the circumference of the brake.

A further object is to provide such a hollow annular vent tube which is most advantageously arranged in the brake by being arranged in a plane parallel to the adjacent faces of the rotor and stator and projecting into the pockets of both of these members, thus making it possible so to incline the vent openings of the tube as to substantially eliminate any flow of water into the vent tube during the operation of the apparatus.

A further object is to provide such a hydrodynamic brake venting means that controlling of the rate of venting may be provided for externally of the brake depending upon the operating conditions under which it is desired to perform.

Other objects and advantages of the invention will become apparent during the course of the following description.

In the drawings, we have shown one embodiment of the invention. In this showing, Figure 1 is a side elevation of a hydrodynamic brake, partly in section, showing the present invention applied thereto, Figure 2 is an enlarged fragmentary face view of a portion of one of the stator members of the brake showing the vent tube and the outlet tube therefor, Figure 3 is an enlarged fragmentary sectional view on line 3—3 of Figure 2, Figure 4 is an enlarged fragmentary sectional view of the radially outer portions of a stator member and a coacting rotor showing the annular vent tube secured in position with respect to the stator, the vent pipe for the vent tube being shown somewhat distorted and as lying in the plane of section, this distortion being for the purpose of illustration, and Figure 5 is an enlarged fragmentray sectional view on line 5—5 of Figure 2.

In connection with the present construction, reference is made to applicants' copending application, Serial No.

277,656, filed March 20, 1952, in which is disclosed and claimed certain novel structural features such as the water inlet means for the brake, the radial shortening of certain of the vanes of the rotor and stator, and the use of a shroud plate in conjunction with each stator more accurately to predetermine the circulation of water in the brake. The present invention has been illustrated in conjunction with such features since it is preferred, although not necessary, that the present invention be used with a brake of such type. The features referred to form per se no part of the present invention except in combination therewith as defined in certain of the appended claims.

Referring to Figure 1, the numeral 10 designates the relatively heavy shaft for the brake having one end 11 projecting from the brake for connection with the rotary unit whose rotational speed is to be controlled. A rotor, indicated as a whole by numeral 12, is keyed as at 13 to the shaft 10 to be driven thereby. In the present instance, the brake is illustrated, as in the copending application referred to, as comprising a single rotor having pockets cooperating with the pockets of a pair of outwardly arranged stator members described below. As illustrated, therefore, the rotor comprises a plurality of pockets 14 separated by vanes 15, certain of which have their radially innner ends terminating as at 16 so that a plurality of pockets 14 communicate with a single radially inner pocket 17. The purpose of this is to reduce interference with the radially outward flow of liquid through the pockets of the rotor, as fully described in our copending application referred to. The vanes 15 are circumferentially notched as at 18 for a purpose to be described, and the periphery of the rotor is annularly grooved as at 20 to reduce the weight of the rotor. As stated above, two stators are employed for the opposite rotor pockets 14. These stator members are identical, and only one need be described in detail. Each stator member is indicated as a whole by the numeral 25 and each has its inner face 26 lying in a plane perpendicular to the axis of the shaft and parallel to and slightly spaced from the adjacent face 27 of the rotor. This slight space, in accordance with conventional practice, is provided for the radially outward escape of liquid in the brake, as will be apparent.

Each stator is mounted on a stationary hub 30 having an annular flange 31 to which the stator is fixed by bolts 32. The hubs support the shaft 10 for rotation by means of suitable anti-friction bearings 33 covered by a plate 34 bolted as at 35 to the hub 30. Suitable leakproof packing 36 surrounds the shaft 10 inwardly of each set of bearings 33. Any suitable means may be employed for supporting the stator members. This is usually accomplished by the use of a heavy rigid cradle, and the stator members are provided with lugs 38 for the bolting of the stator members to the cradle in accordance with conventional practice.

The stator members are provided with annular flanges 40 surrounding the rotor. These flanges have machined engaging faces 41 and the stator members are bolted to each other as at 42.

At the top of the brake, the flanges 40 are provided with pockets 44 communicating with the annular clearance between the rotor and the flanges 40, such clearance communicating with fittings 45 leading to a manifold 46 from which the water is discharged through an outlet 47, preferably controlled by valve means as shown in the copending application referred to.

The stator members are preferably formed in accordance with the disclosure of our copending application referred to. Each stator member is provided with pockets 50 formed by vanes 51 certain of which is in uniform groups terminate in inner edges 52 whereby successive pluralities of the pockets 50 communicate with larger radially inner pockets 53. This eliminates the extension of the vanes 51 to the inner limits of the stator pockets, thus tending to prevent any restriction in the radially inward flow of the water through the stator pockets. The directions of flow of the water in the pockets in the rotor and stator members are indicated by the arrows in Figure 1.

The back walls of the pockets 53 are offset away from the rotor member and inclined from the rotor member radially outwardly as at 54. The larger pockets 53 accordingly have the radially outer ends of their back walls spaced from the radially inner limits of the back walls of the pockets 50, and the pockets 53 communicate through openings 55 with an annular manifold 56. This manifold is covered by an annular plate 57 bolted to the stator as at 58. Water is supplied to each manifold 56 through an inlet connection 59. This water inlet means also is fully described in our copending application referred to, together with the flow control means associated therewith.

Integral with each stator member is an annular shroud plate 64 having its radially inner extremity coinciding with the vane edges 52. The inner face of each shroud plate is coincident with the plane of the inner face 26 of the associated stator member. This shroud plate controls the flow of water from the radially outer portions of the rotor pockets into the corresponding portions of the stator pockets and controls the flow of water from the radially inner portions of the stator pockets into the corresponding portions of the rotor pockets. The shroud plates also tend to increase the efficiency of the flow of liquid to the brake through the openings 55.

The vortex area of coacting rotor and stator pockets occurs in the region of the notches 18. For the purpose of venting such portion of the brake to the atmosphere, each stator member is grooved in its longitudinally innner face as at 65 (Figures 3 and 4) to receive a torus 66 in the form of an annular pipe, the cross section shape and arrangement of which is shown in the figures just referred to. The member 66 is in the form of an annular tube which seats in the groove 65 and is secured in position by radially outer welding 67 and radially inner welding 68. The vent tube 66 projects across the space between the faces 26 and 27, and may be evenly divided on opposite sides of such space or may be arranged as shown in Figure 4. The notch 18 is deeper and radially longer than the portion of the tube 66 projecting therethrough for the free circumferential balancing of pressures around the vortex referred to.

As previously stated, the flow of water is radially outwardly in the rotor pockets 14 and radially inwardly through the stator pockets. The vent tube 66 is provided with two sets of vent openings 70 and 71, the former of which incline radially outwardly and the latter of which incline radially inwardly. The flow of water accordingly is generally in the direction of inclination of these openings to eliminate the scooping of water into the tube 66. These openings 70 and 71 may be of any number spaced circumferentially around the tube 66, and preferably one is arranged intermediate each adjacent pair of stator vanes as shown in Figure 2.

A vent pipe 74 is provided for each vent tube or ring 66, this tube being shown in the plane of section in Figure 4 for the purpose of illustration. As will be clear from Figures 2 and 5, however, the vent pipe 74 lies in close proximity to one of the vanes 51 of the stator, these vanes being inclined in accordance with conventional practice. The vent ring 66 appears elliptical in Figure 5 because of the angular direction of the section along which Figure 5 is taken, the line of section being indicated by the numeral 5—5 in Figure 2. The pipe 74 of each stator member is located on and closely adjacent the obtuse side of one of the vanes 51 to minimize as much as possible any obstruction to or interruption of the flow of water through the associated stator pocket. Each pipe projects through the longitudinally outer wall through an opening 75 therein (Figure 5) and is welded in position as at 76.

Beyond or externally of each stator member, the associated vent pipe 74 is provided with a valve 77 to control the venting rate in accordance with the particular brake operating conditions present.

Operation

The theory of operation of hydrodynamic brakes is well known and requires no detailed description. The water in the brake pockets flows in the direction of the arrows in Figures 1 and 4. Water escapes radially outwardly between the adjacent rotor and stator faces 26 and 27 and flows into the annular clearance around the rotor and thus outwardly through the fittings 45, manifold 46 and outlet 47. The flow of fresh water into the brake is maintained from the manifold 56 through the openings 55, this flow being generally in the direction of the radially inward flow of water through the stator pockets. Thus an influx of water is induced into the stator pockets at points remote from any pressure which may be present in the vortex areas of the brake.

The present construction provides an improved method of venting the pockets of the brake. The tube 66 straddles the clearance space between the rotor and each stator and its arrangement permits the locating of any desired number of vent holes 70 and 71 in the most advantageous positions both circumferentially and in vertical section. For example, the circulation of water in the pockets of the rotor is radially outward and accordingly it will be apparent that there is no tendency for water in the rotor pockets to enter the openings 70. This particular disadvantage otherwise might occur when the brake is operating full or pratically full of water. Similarly, the vent openings 71 are inclined radially inwardly, generally in the direction of the radially inward flow of water in the stator pockets. Therefore, there also will be no tendency for water in the stator pockets to enter the "vortex ring" 66. It has been found advantageous to locate the vent openings 70 and 71 in circumferentially spaced relationship to the rotor and stator vanes, and preferably intermediate these vanes.

The "vortex ring" 66 makes it impossible for pressure or vacuum in the vortex to vary about the circumference of the brake, as otherwise might be the case if, for example, there were any uneven distribution of fresh cool inlet water or discharge of hot water from the pockets about the circumference. The arrangement makes it possible to vary the number, size and location of the vent openings 70 and 71 for different conditions of operation.

If there are any conditions present which make it desirable not to completely vent the vortex areas, the valves 77 may be partially closed to control the rate of venting. For some operating conditions where venting is not desirable and even may be undesirable, for example in short intermittent braking operations, the valves 77 may be completely closed.

The location of the ring 66 within the radial limits of each associated shroud plate 64 assists in the prevention of water entering either of the openings 70 or 71, the radial movement of the water to a large extent being controlled by the shroud plates. For example, in the absence of these plates, there would be a tendency, under some conditions, for water to flow from the rotor to the stator pockets, or from the stator to the rotor pockets immediately adjacent the radially inner and outer limits of the tube 66. Under such conditions, some water would enter the tube 66, but this action is prevented by the shroud plates 64 which insure radial movement of the water inwardly and outwardly past the tube 66 before moving from the pockets of one member into the pockets of the other member.

The vortex area of the brake pockets frequently will completely surround the tube 66. Therefore, a substantial degree of success in the operation of the device may be obtained by using either set of vent openings 70 or 71. Obviously, however, the venting will be more perfectly and completely carried out by using both sets of such vent openings.

It also will be noted that the present invention involves, as regards the venting means, no moving parts, and accordingly the device operates over long periods of time without attention or servicing.

We claim:

1. A hydrodynamic brake comprising a rotor and a stator having adjacent faces and provided with coacting fluid pockets, and wholly stationary means substantially concentric with said rotor and extending at least partially around said pockets for relieving air or vapor pressure accumulations or partial vacuum in the brake, said means being of hollow closed cross-section.

2. A hydrodynamic brake comprising a rotor and a stator having adjacent faces and provided with coacting fluid pockets, there being a gap between the adjacent faces of said rotor and said stator, and a wholly stationary hollow substantially toroidal vent ring concentric with said rotor and coincident with the gap between said adjacent faces and projecting therebeyond longitudinally of said rotor and said stator, said ring being provided with vent openings.

3. A hydrodynamic brake comprising a rotor and a stator having adjacent faces and provided with coacting fluid pockets, wholly stationary means substantially concentric with said rotor and extending at least partially around said pockets for relieving air or vapor pressure accumulations or partial vacuum in the brake, said means being of hollow closed cross-section, a vent pipe communicating at one end with said means and projecting through said stator exteriorly of the brake, and means for controlling the rate of venting through said pipe.

4. A hydrodynamic brake comprising a rotor and a stator having adjacent faces and provided with coacting fluid pockets, there being a gap between the adjacent faces of said rotor and said stator, a wholly stationary hollow substantially toroidal vent ring concentrc with said rotor and coincident with the gap between said adjacent faces and projecting therebeyond longitudinally of said rotor and said stator, said ring being provided with vent openings, a vent pipe communicating at one end with said vent ring and projecting through said stator exteriorly of the brake, and means for controlling the rate of venting through said pipe.

5. A hydrodynamic brake comprising a rotor and a stator having adjacent faces and provided with vanes forming coacting fluid pockets, and a wholly stationary hollow vent ring arranged substantially parallel to the planes of said faces and having vent openings communicating with said pockets, the portions of said rotor and said stator adjacent said adjacent faces being circumferentially grooved to receive said ring, said ring projecting partially into the pockets of both said rotor and said stator, and a vent pipe communicating at one end with said ring and having its other end projecting exteriorly of the brake.

6. A hydrodynamic brake comprising a rotor and a stator having adjacent faces and provided with vanes forming coacting fluid pockets, a wholly stationary hollow vent ring arranged substantially parallel to the planes of said faces and having vent openings communicating with said pockets, the portons of said rotor and said stator adjacent said adjacent faces being circumferentially grooved to receive said ring, said ring projecting partally into the pockets of both said rotor and said stator, a vent pipe communicating at one end with said ring and having its other end projecting exteriorly of the brake, and a valve connected in said pipe exteriorly of the brake to control the rate of venting through said pipe.

7. A hydrodynamic brake comprising a rotor and a stator having adjacent parallel faces between which there is a gap for the radially outward flow of liquid, said rotor and said stator having coacting pockets formed by substantially radial vanes, a wholly stationary substantially toroidal vent ring arranged substantially concentric with said rotor and bridging the gap between said adjacent faces, said ring being of substantially greater cross sectional width than said gap and the portions of said rotor and said stator adjacent said adjacent faces being circumferentially grooved to accommodate said ring, said ring being provided with spaced vent openings communicating with the pockets of said rotor and inclined radially outwardly from said adjacent faces, and means for venting said ring to the atmosphere.

8. A hydrodynamic brake comprising a rotor and a stator having adjacent parallel faces between which there is a gap for the radially outward flow of liquid, said rotor and said stator having coacting pockets formed by substantially radial vanes, a wholly stationary substantially toroidal vent ring arranged substantially concentric with said rotor and bridging the gap between said adjacent faces, said ring being of substantially greater cross sectional width than said gap and the portions of said rotor and said stator adjacent said adjacent faces being circumferentially grooved to accommodate said ring, said ring being provided with spaced vent openings communicating with the pockets of said stator and inclined inwardly away from said adjacent faces, and means for venting said ring to the atmosphere.

9. A hydrodynamic brake comprising a rotor and a stator having adjacent parallel faces between which there is a gap for the radially outward flow of liquid, said rotor and said stator having coacting pockets formed by substantially radial vanes, a wholly stationary substantially toroidal vent ring arranged substantially concentric with said rotor and bridging the gap between said adjacent faces, said ring being of substantially greater cross sectional width than said gap and the portions of said rotor and said stator adjacent said adjacent faces being circumferentially grooved to accommodate said ring, said ring being provided with spaced vent openings communicating with the pockets of said rotor and inclined radially outwardly from said adjacent faces, said ring being further provided with circumferentially spaced vent openings communicating with the pockets of said stator and inclined inwardly away from said adjacent faces, and means for venting said ring to the atmosphere.

10. A hydrodynamic brake comprising a rotor and a stator having adjacent parallel faces between which there is a gap for the radially outward flow of liquid, said rotor and said stator having coacting pockets formed by substantially radial vanes, a wholly stationary substantially toroidal vent ring arranged substantially concentric with said rotor and bridging the gap between said adjacent faces, said ring being of substantially greater cross sectional width than said gap and the portions of said rotor and said stator adjacent said adjacent faces being circumferentially grooved to accommodate said ring, said ring being provided with spaced vent openings communicating with the pockets of said rotor and inclined radially outwardly from said adjacent faces, a vent pipe having one end communicating with said ring and having its other end extending externally of the brake, and means for controlling the rate of venting through said pipe.

11. A hydrodynamic brake comprising a rotor and a stator having adjacent parallel faces between which there is a gap for the radially outward flow of liquid, said rotor and said stator having coacting pockets formed by substantially radial vanes, a wholly stationary substantially toroidal vent ring arranged substantially concentric with said rotor and bridging the gap between said adjacent faces, said ring being of substantially greater cross sectional width than said gap and the portions of said rotor and said stator adjacent said adjacent faces being circumferentially grooved to accommodate said ring, said ring being provided with spaced vent openings communicating with the pockets of said stator and inclined inwardly away from said adjacent faces, a vent pipe communicating at one end with said ring and at its other end with the atmosphere, and a valve controlling the rate of venting through said pipe.

12. A hydrodynamic brake comprising a rotor and a stator having adjacent parallel faces between which there is a gap for the radially outward flow of liquid, said rotor and said stator having coacting pockets formed by substantially radial vanes, a wholly stationary substantially toroidal vent ring arranged substantially concentric with said rotor and bridging the gap between said adjacent faces, said ring being of substantially greater cross sectional width than said gap and the portions of said rotor and said stator adjacent said adjacent faces being circumferentially grooved to accommodate said ring, said ring being provided with spaced vent openings communicating with the pockets of said rotor and inclined radially outwardly from said adjacent faces, said ring being further provided with circumferentially spaced vent openings communicating with the pockets of said stator and inclined inwardly away from said adjacent faces, a vent pipe communicating at one end with said ring and extending through said stator externally of the brake, and a valve arranged in said pipe externally of the brake for controlling the venting rate therethrough.

13. A hydrodynamic brake comprising a rotor and a stator provided with parallel adjacent faces, said rotor and said stator having circumferentially spaced vanes forming pockets therebetween, there being a gap between said adjacent faces for the radially outward flow of liquid from the brake, a hollow toroidal vent ring concentric with said rotor and parallel to said adjacent faces, the cross sectional width of said ring being greater than said gap and the adjacent face portions of said rotor and said stator being circumferentially grooved to accommodate said ring, said ring being wholly fixed to said stator and having circumferentially spaced vent openings, and a vent pipe communicating at one end with said ring and projecting through a pocket of said stator in close proximity to one of the vanes thereof, said vent pipe communicating with the atmosphere.

14. Apparatus constructed in accordance with claim 13 wherein at least some of said vent openings communicate with the pockets of said rotor and are inclined outwardly away from said adjacent faces.

15. Apparatus constructed in accordance with claim 13 wherein at least some of said vent openings communicate with the pockets of said stator and are inclined inwardly away from said adjacent faces.

16. Apparatus constructed in accordance with claim 13 wherein said vent openings are in two series, the openings of one series being circumferentially spaced and communicating with the pockets of said rotor and being inclined outwardly away from said adjacent faces, and the openings of the other series being circumferentially spaced and communicating with the pockets of said stator and being inclined inwardly away from said adjacent faces.

17. Apparatus constructed in accordance with claim 13 provided with a manually controllable valve in said vent pipe to control the venting rate therethrough.

18. A hydrodynamic brake comprising a rotor and a stator having adjacent parallel faces and being provided with circumferentially spaced vanes forming pockets, there being a gap between said adjacent faces for the radially outward flow of liquid from the brake, a relatively thin shroud ring carried by said stator and having a longitudinally inner face coincident with the plane of said adjacent face of said stator, said shroud ring having its radially inner and outer edges spaced from the radially inner and outer ends of said pockets and said shroud ring having an annular slot therethrough, a toroidal vent ring concentric with said rotor and arranged in said slot and projecting through said shroud ring, said vent ring having vent openings on opposite sides of the plane of said shroud ring communicating respectively with the pockets of said rotor and the pockets of said stator, and a vent pipe communicating with said vent ring and with the atmosphere.

19. Apparatus constructed in accordance with claim 18 wherein said vent pipe is arranged adjacent the top of the brake and projects through a pocket of said stator parallel and in proximity to one of the vanes of said stator.

20. Apparatus constructed in accordance with claim 18 wherein said vent pipe is arranged adjacent the top of the brake and projects through a pocket of said stator parallel and in proximity to one of the vanes of said stator, and a manually operable valve in said vent pipe for controlling the venting rate therethrough, the vent openings communicating with the pockets of said rotor being inclined outwardly away from said adjacent faces and the openings communicating with the pockets of said stator being inclined inwardly away from said adjacent faces.

21. A hydrodynamic brake comprising a rotor and a stator having flat adjacent faces perpendicular to the axis of said rotor and provided with co-acting fluid pockets, and means for connecting the interior of said brake to the atmosphere, said means comprising a tubular member of closed cross-section carried by said stator and extending at least partially around said axis in radially spaced relation thereto, there being a gap between the adjacent faces of said rotor and said stator and said tubular member being arranged in said gap and extending therebeyond longitudinally of said axis.

References Cited in the file of this patent

UNITED STATES PATENTS

| | | |
|---|---|---|
| 2,226,412 | Schmidt | Dec. 24, 1940 |
| 2,388,112 | Black et al. | Oct. 30, 1945 |

FOREIGN PATENTS

| | | |
|---|---|---|
| 11,267 | Great Britain | May 10, 1911 |